(12) United States Patent
Lim

(10) Patent No.: US 10,969,329 B2
(45) Date of Patent: Apr. 6, 2021

(54) ELLIPSOMETER

(71) Applicant: SAMSUNG DISPLAY CO., LTD., Yongin-si (KR)

(72) Inventor: Yongwoon Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/359,619

(22) Filed: Mar. 20, 2019

(65) Prior Publication Data

US 2019/0360920 A1 Nov. 28, 2019

(30) Foreign Application Priority Data

May 28, 2018 (KR) .................. 10-2018-0060413

(51) Int. Cl.
*G01N 21/21* (2006.01)

(52) U.S. Cl.
CPC ..... *G01N 21/211* (2013.01); *G01N 2201/063* (2013.01); *G01N 2201/0683* (2013.01)

(58) Field of Classification Search
CPC ........... G01N 21/211; G01N 2201/063; G01N 2201/068; G01N 2201/0683
See application file for complete search history.

(56) References Cited

U.S. PATENT DOCUMENTS

| | | | |
|---|---|---|---|
| 5,037,199 A * | 8/1991 | Hlousek | G01N 21/255 356/246 |
| 6,031,614 A | 2/2000 | Michaelis et al. | |
| 6,052,188 A | 4/2000 | Fluckiger et al. | |
| 6,937,333 B2 | 8/2005 | Horie et al. | |
| 7,088,448 B1 | 8/2006 | Hahn et al. | |
| 7,196,793 B2 | 3/2007 | Nabatova-Gabain et al. | |
| 7,280,210 B2 | 10/2007 | Nabatova-Gabain et al. | |
| 8,004,677 B2 | 8/2011 | Lee et al. | |
| 8,009,292 B2 | 8/2011 | Choi et al. | |
| 8,199,336 B2 | 6/2012 | Nabatova-Gabain et al. | |
| 8,446,584 B2 | 5/2013 | Krishnan et al. | |
| 8,599,379 B2 | 12/2013 | Sakai et al. | |
| 8,711,349 B2 | 4/2014 | Gao et al. | |
| 9,255,789 B2 | 2/2016 | Park et al. | |
| 9,267,879 B2 | 2/2016 | Ko et al. | |
| 9,442,063 B2 | 9/2016 | Di et al. | |
| 9,581,498 B2 | 2/2017 | Cho et al. | |
| 9,719,946 B2 | 8/2017 | Leem et al. | |
| 10,001,444 B2 | 6/2018 | Ko et al. | |
| 2007/0247623 A1 | 10/2007 | Kim et al. | |
| 2009/0116040 A1 | 5/2009 | Bischoff et al. | |
| 2010/0121607 A1* | 5/2010 | Nabatova-Gabain | G01B 11/065 702/172 |

(Continued)

FOREIGN PATENT DOCUMENTS

| | | |
|---|---|---|
| JP | 2011-002240 | 1/2011 |
| KR | 2000-0047818 | 7/2000 |

(Continued)

*Primary Examiner* — Hina F Ayub
(74) *Attorney, Agent, or Firm* — F. Chau & Associates, LLC

(57) ABSTRACT

An ellipsometer includes: a gantry; a polarization generator and a polarization analyzer mounted in the gantry; and a focusing lens disposed on a sample on a stage, wherein the sample is an object to be measured, wherein a vertical section of the focusing lens is a semi-circle.

19 Claims, 3 Drawing Sheets

(56) References Cited

U.S. PATENT DOCUMENTS

| | | |
|---|---|---|
| 2014/0313511 A1 | 10/2014 | Cho et al. |
| 2015/0014540 A1* | 1/2015 | Ikushima ............... G02B 13/24 |
| | | 250/340 |
| 2015/0064737 A1* | 3/2015 | Moriwaki .............. G01N 21/47 |
| | | 435/29 |
| 2016/0153894 A1 | 6/2016 | Cho et al. |
| 2018/0113069 A1 | 4/2018 | Cho et al. |

FOREIGN PATENT DOCUMENTS

| | | |
|---|---|---|
| KR | 2001-0022767 | 3/2001 |
| KR | 2001-0053381 | 6/2001 |
| KR | 2002-0008697 | 1/2002 |
| KR | 2003-0049473 | 6/2003 |
| KR | 2003-0055960 | 7/2003 |
| KR | 1020040034375 | 4/2004 |
| KR | 1020040048405 | 6/2004 |
| KR | 1020050091997 | 9/2005 |
| KR | 1020060078939 | 7/2006 |
| KR | 1020060078949 | 7/2006 |
| KR | 1020060108272 | 10/2006 |
| KR | 1020060108273 | 10/2006 |
| KR | 10-0701301 | 3/2007 |
| KR | 10-0742982 | 7/2007 |
| KR | 10-0757378 | 9/2007 |
| KR | 1020070096390 | 10/2007 |
| KR | 1020090049226 | 5/2009 |
| KR | 1020090049951 | 5/2009 |
| KR | 1020090054017 | 5/2009 |
| KR | 10-2010-0033164 | 3/2010 |
| KR | 1020100051766 | 5/2010 |
| KR | 1020100064612 | 6/2010 |
| KR | 1020100091987 | 8/2010 |
| KR | 1020100135121 | 12/2010 |
| KR | 1020100138136 | 12/2010 |
| KR | 1020110000583 | 1/2011 |
| KR | 1020130019495 | 2/2013 |
| KR | 10-1357326 | 1/2014 |
| KR | 1020140039053 | 3/2014 |
| KR | 1020140045388 | 4/2014 |
| KR | 1020140069290 | 6/2014 |
| KR | 1020150012509 | 2/2015 |
| KR | 1020150025745 | 3/2015 |
| KR | 1020150031827 | 3/2015 |
| KR | 10-1590389 | 2/2016 |
| KR | 1020160066448 | 6/2016 |
| KR | 10-2016-0097576 | 8/2016 |
| KR | 1020160109786 | 9/2016 |
| KR | 1020170063317 | 6/2017 |
| KR | 10-1761251 | 7/2017 |
| KR | 10-2017-0104245 | 9/2017 |
| WO | WO 2009/064081 | 5/2009 |
| WO | WO 2010/147300 | 12/2010 |

* cited by examiner

ELLIPSOMETER

CROSS-REFERENCE TO RELATED APPLICATION

This application claims priority under 35 U.S.C. § 119 from, and the benefit of, Korean Patent Application No. 10-2018-0060413, filed on May 28, 2018 in the Korean Intellectual Property Office, the contents of which are herein incorporated by reference in their entirety.

BACKGROUND

1. Technical Field

One or more embodiments are directed to an ellipsometer, and more particularly, to an imaging ellipsometer.

2. Discussion of the Related Art

Ellipsometry refers to a method of measuring a complex refractive index of a material based on a wavelength of light by identifying changes in polarization characteristics of light by using various methods, and is also referred to as an ellipse method or an ellipse analyzing method.

Semiconductors and high-tech components of displays, such as organic light-emitting devices (OLED), etc., are mostly manufactured as thin films, and defects or changes in the thin films can affect these devices. Thus, a precise examination of a thin films can detect these defects, and ellipsometry can analyze, in real time, not only a structure of a single-layered thin film, but also a structure of a multi-layered thin film, and thus, is often used to examine a thin film.

However, while the performance of components has improved, sizes of components have decreased, and thus, a size of a pattern of a wire, etc., included in a component may be much less than a spot size of light that is used for ellipsometry. Thus, light may not be precisely focused on a minute pattern, and a minute pattern may not be precisely measured using a previous ellipsometer.

SUMMARY

One or more embodiments can provide an ellipsometer that has an improved auto-focus function.

Additional features will be set forth in part in the description which follows and, in part, will be apparent from the description, or may be learned by practice of the presented embodiments.

According to one or more embodiments, an ellipsometer includes: a gantry; a polarization generator and a polarization analyzer mounted in the gantry; and a focusing lens disposed on a sample on a stage, wherein the sample is an object to be measured, wherein a vertical section of the focusing lens is a semi-circle.

The focusing lens may have one of a semi-spherical shape or a semi-cylindrical shape.

The gantry may include a first coupling portion and a second coupling portion, and a first guide and a second guide, wherein the polarization generator and the polarization analyzer are respectively mounted in the first and second coupling portions, and the first and second coupling portions are respectively coupled to the first and second guides, respectively.

The gantry may further include a longitudinal supporting portion to which the first and second guides are connected, wherein each of the first and second guides is arc-shaped, and the first and second guides are symmetrically positioned with respect to the longitudinal supporting portion.

The first and second coupling portions may move so that the first and second coupling portions remain symmetrically positioned with respect to the longitudinal supporting portion.

The polarization generator may include a light source that generates light, a linear polarizer in front of the light source based on a light propagation direction, and a compensator in front of the linear polarizer based on the light propagation direction.

The polarization analyzer may include an object lens that changes a path of reflected light and an analyzer that adjusts a polarization direction of the reflected light.

The ellipsometer may further include a detector into which the reflected light, after having passed through the analyzer, is incident, wherein the detector includes a charge-coupled device (CCD) camera.

According to one or more embodiments, an ellipsometer includes: a gantry that includes a longitudinal supporting portion, a first guide and a second guide connected to the longitudinal supporting portion, and a first coupling portion and a second coupling portion respectively coupled to the first and second guides; a polarization generator mounted in the first coupling portion; a polarization analyzer mounted in the second coupling portion; and a focusing lens disposed on a sample on a stage, wherein the sample is an object to be measured; wherein an angle formed by a central axis of the longitudinal supporting portion and a central axis of the polarization generator is the same as an angle formed by the central axis of the longitudinal supporting portion and a central axis of the polarization analyzer.

Each of the first and second guides may be arc-shaped, and the first and second guides may be symmetrically positioned with respect to the longitudinal supporting portion.

The first and second coupling portions may move so that the first and second coupling portions remain symmetrically positioned with respect to the longitudinal supporting portion.

A vertical section of the focusing lens may be a semi-circle.

The focusing lens may have one of a semi-spherical shape or a semi-cylindrical shape.

The polarization generator may include a light source that generates light, a linear polarizer in front of the light source based on a light propagation direction, and a compensator in front of the linear polarizer based on the light propagation direction.

The polarization analyzer may include an object lens that changes a path of reflected light and an analyzer that adjusts a polarization direction of the reflected light.

The ellipsometer may further include a charge-coupled device (CCD) camera into which the reflected light, after having passed through the analyzer, is incident.

According to one or more embodiments, an ellipsometer includes: a gantry that includes a first coupling portion, a second coupling portion and longitudinal supporting portion; a polarization generator and a polarization analyzer mounted in the gantry; and a focusing lens disposed on a sample, wherein the sample is an object to be measured, wherein a vertical section of the focusing lens is a semi-circle, and wherein the first and second coupling portions move so that the first and second coupling portions remain symmetrically positioned with respect to the longitudinal supporting portion.

The gantry may include a first guide and a second guide that are both connected to the longitudinal supporting portion, wherein each of the first and second guides is arc-shaped, and the first and second guides are symmetrically positioned with respect to the longitudinal supporting portion, and the first and second coupling portions are respectively coupled to the first and second guides.

The polarization generator may be mounted in the first coupling portion. The polarization generator may include a light source that generates light, a linear polarizer in front of the light source based on a light propagation direction, and a compensator in front of the linear polarizer based on the light propagation direction.

The polarization analyzer may be mounted in the second coupling portion. The polarization analyzer may include an object lens that changes a path of reflected light, an analyzer that adjusts a polarization direction of the reflected light, and a detector into which the reflected light, after having passed through the analyzer, is incident.

DETAILED DESCRIPTION

Figure 1:
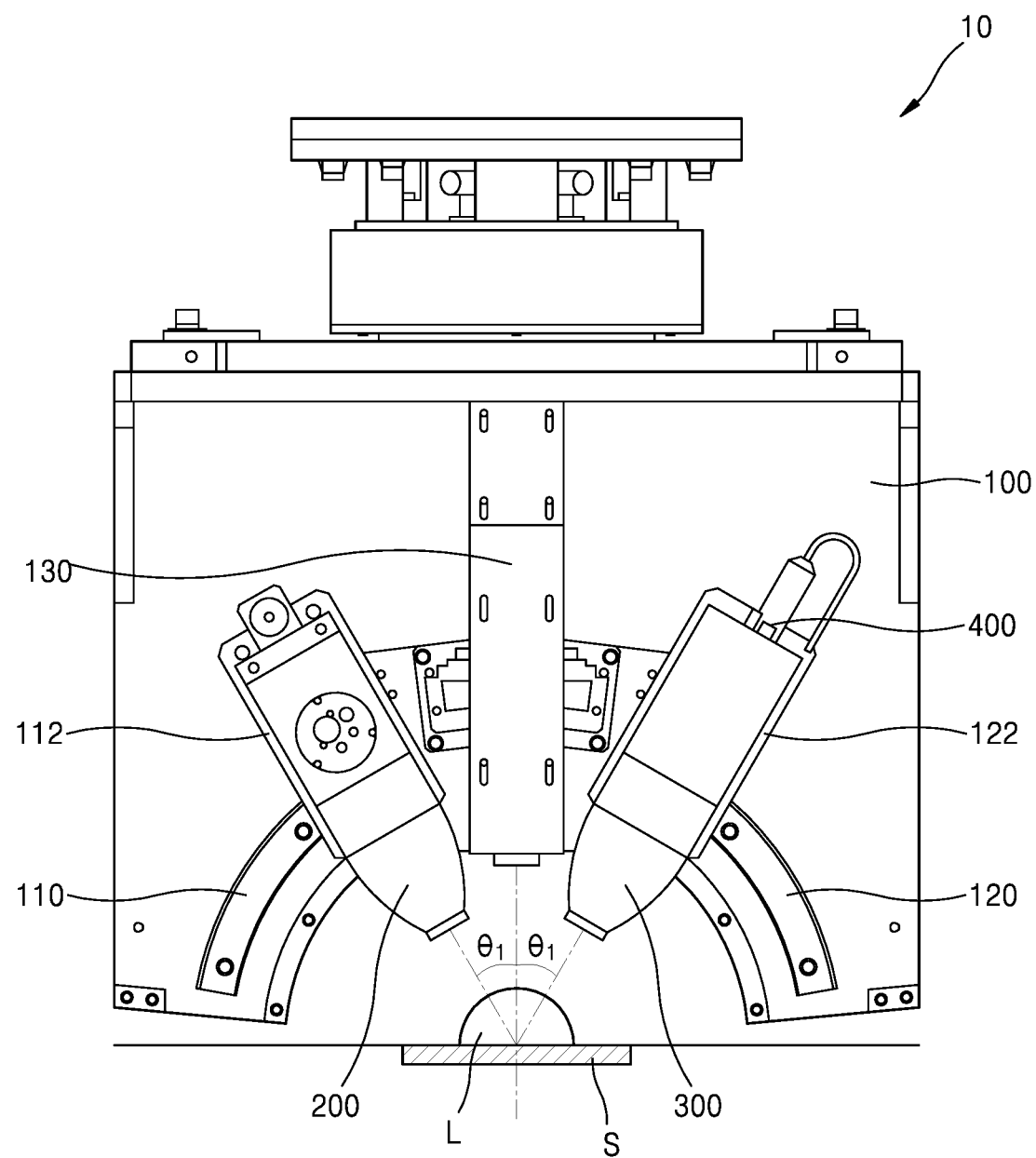
FIG. 1 is a schematic cross-sectional view of an example of an ellipsometer according to an embodiment.

Exemplary embodiments of the present disclosure may have various modifications and embodiments, and certain embodiments will be illustrated in the drawings and described in detail in the detailed description. The effects, characteristics, and methods of achieving the effects and the characteristics of the present disclosure will be made clear with reference to the embodiments described below in detail with reference to the drawings. However, the present disclosure is not limited to the embodiments described hereinafter, and may be realized as various embodiments.

It will be understood that when a layer, region, or component is referred to as being "formed on," another layer, region, or component, it can be directly or indirectly formed on the other layer, region, or component.

Sizes of elements in the drawings may be exaggerated for convenience of explanation.

Hereinafter, exemplary embodiments of the present disclosure will be described in detail with reference to the accompanying drawings. Like reference numerals may refer to like elements, and their repeated descriptions will not be given.

Figure 2:
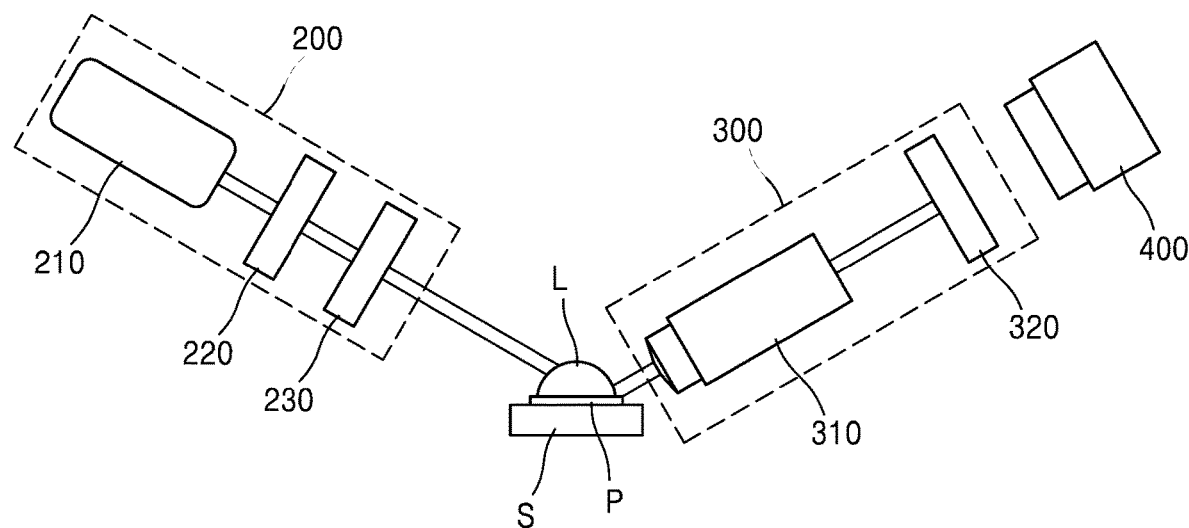
FIG. 2 is a schematic cross-sectional view of a structure of an ellipsometer illustrated in FIG. 1.
Figure 3:
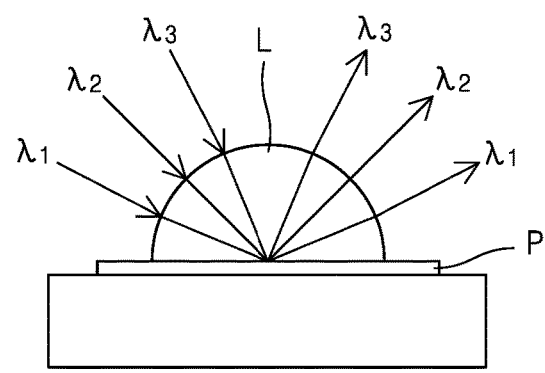
FIG. 3 is a conceptual view that illustrates an auto-focus function of a focusing lens illustrated in FIG. 1.

FIG. 1 is a schematic cross-sectional view of an example of an ellipsometer 10 according to an embodiment, FIG. 2 is a schematic cross-sectional view of a structure of an ellipsometer 10 of FIG. 1, and FIG. 3 is a conceptual view that illustrates an auto-focus function of a focusing lens L of FIG. 1.

Referring to FIGS. 1 through 3, the ellipsometer 10 according to an embodiment includes a gantry 100, a polarization generator 200 and a polarization analyzer 300 mounted in the gantry 100, and a focusing lens L disposed on a stage S on which a sample P, an object to be examined, is placed.

According to an embodiment, the gantry 100 moves in a vertical direction to adjust a distance between the sample and the polarization generator 200 to adjust a focal length based on a wavelength of light irradiated from the polarization generator 200.

According to an embodiment, the gantry 100 includes a first coupling portion 112 and a second coupling portion 122 on which the polarization generator 200 and the polarization analyzer 300 are respectively mounted, and a first guide 110 and a second guide 120 to which the first coupling portion 112 and the second coupling portion 122 are respectively coupled. The gantry 100 further includes a longitudinal supporting portion 130 that extends in a vertical direction.

According to an embodiment, the first and second guides 110 and 120 are connected to the longitudinal supporting portion 130, and wires connected to the polarization generator 200 and the polarization analyzer 300 can be accommodated in the longitudinal supporting portion 130.

According to an embodiment, the first and second guides 110 and 120 are symmetrically positioned with respect to each other based on a center line of the longitudinal supporting portion 130. Each of the first and second guides 110 and 120 has an arc shape. Thus, when extension lines are formed along the first and second guides 120, a circular shape may be formed.

According to an embodiment, the polarization generator 200 is mounted in the first coupling portion 112 that is coupled to the first guide 110. The first coupling portion 112 moves along an arc-shaped trajectory along the first guide 110. Accordingly, when light generated from the polarization generator 200 is irradiated onto the stage S, the first coupling portion 112 can adjust an incident angle of the light generated from the polarization generator 200.

According to an embodiment, the polarization analyzer 300 is mounted in the second coupling portion 122 that is coupled to the second guide 120. The second coupling portion 122 moves along an arc-shaped trajectory along the second guide 120. Here, the first and second coupling portions 112 and 122 move so that the first and second coupling portions 112 and 122 remain symmetrically positioned with respect to the longitudinal supporting portion 130. That is, the second coupling portion 122 moves by a same distance as the first coupling portion 112 but in an opposite direction to the first coupling portion 112. For example, when the first coupling portion 112 moves in an counter-clockwise direction, the second coupling portion 122 moves in a clockwise direction. Thus, an angle $\theta1$ formed by a central axis of the longitudinal supporting portion 130 and a central axis of the polarization generator 200 is always equal to an angle $\theta1$ formed by the central axis of the longitudinal supporting portion 130 and a central axis of the polarization analyzer 300.

According to an embodiment, the polarization generator 200 includes a light source 210 that generates light, a linear polarizer 220 in front of the light source 210 based on a light propagation direction, and a compensator 230 in front of the linear polarizer 220 based on the light propagation direction.

According to an embodiment, the light source 210 emits broadband light. For example, the light source 210 can emit visible light. However, embodiments of the present disclosure are not limited thereto. The wavelength range of the light generated by the light source 210 can vary according to an object of to be measured. In general, the wavelength can range between an ultraviolet (UV) range and a near-infrared (NIR) range. The light source 210 may emit light of a specific wavelength or may simultaneously emit light of different wavelengths.

According to an embodiment, the linear polarizer 220 linearly polarizes the light emitted from the light source 210 and is positioned in front of the light source 210. The linear polarizer 220 can rotate to adjust a polarization direction of incident light.

According to an embodiment, the compensator 230 adjusts a phase difference of the incident light via rotation. That is, the linear polarizer 220 determines the polarization direction of the light incident into the sample P, and the compensator 230 determines the phase difference between a p-wave and an s-wave.

According to an embodiment, the light generated from the light source 210 passes through the linear polarizer 220 and the compensator 230, after which it has a specific polarization state, and is irradiated onto the sample P. The light irradiated onto the sample P is reflected by the sample P, and the polarization state may change. The reflected light is incident into the polarization analyzer 300.

According to an embodiment, the polarization analyzer 300 includes an object lens 310 and an analyzer 320, and the reflected light having passed through the analyzer 320 is incident into the detector 400.

According to an embodiment, the object lens 310 changes an optical path so that the reflected light reflected from the sample P is incident into the analyzer 320. The analyzer 320 adjusts a polarization direction of the light reflected from the sample P.

According to an embodiment, the detector 400 obtains an image of the sample P from light received by the analyzer 320. For example, the detector 400 can be a charge-coupled device (CCD) camera, but is not limited thereto. Thus, according to an embodiment of the present disclosure, a thin film of the sample P is measured via a surface measurement method, and thus, an image of a large area of a thin film may be obtained at once.

According to an embodiment, light can have different focal lengths based on wavelength, polarization state, etc. Thus, when multiple thin films are analyzed, different light is irradiated to each thin film, and thus, light can be focused on the sample P by precisely moving the gantry 100 based on the wavelength of the light. Also, when a physical property of the sample P is analyzed, the measurement is performed by changing an angle of incident light, and the focus varies as a function of the incident angle of the light. Here, when a line width of the sample P is less than a spot size of the light irradiated on the sample P, the focus may not be precisely adjusted.

However, according to an embodiment of the present disclosure, the situation can be addressed by positioning the focusing lens L on the sample P. A vertical section of the focusing lens L is a semi-circle and includes a material, such as glass, etc., and the sample P is positioned to overlap a center of the semi-circle of the lens L.

For example, as illustrated in FIG. 3, when first light $\lambda 1$, second light $\lambda 2$, and third light $\lambda 3$ each having a different incident angle are irradiated on the sample P by repositioning the polarization generator 200, all of the first light $\lambda 1$, the second light $\lambda 2$, and the third light $\lambda 3$ incident via the focusing lens L is focused toward a center of the lens L. Thus, a phenomenon in which the focus changes based on the angle of the incident light can be prevented, and the focus can be automatically adjusted to the sample P.

In addition, according to an embodiment, since the focusing lens L is located on the sample P, there is no need to precisely move the gantry 100 to adjust the focus, even if the wavelength of light changes. Thus, the measurement time of the thin film can be reduced.

Figure 4:
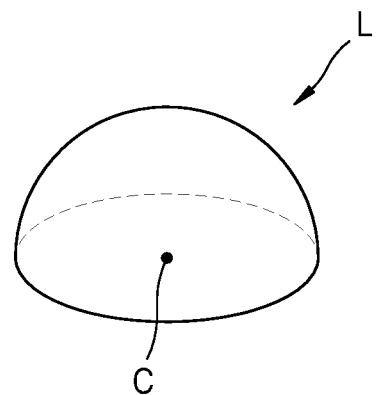
FIG. 4 is a schematic perspective view of an example of a focusing lens illustrated in FIG. 1.

FIG. 4 is a schematic perspective view of an example of a focusing lens L of FIG. 1.

Referring to FIG. 4, according to an embodiment, the focusing lens L has a semi-spherical shape. Here, a bottom surface of the focusing lens L is flat, and the sample P is positioned to overlap a center C of the semi-sphere.

According to an embodiment, all of the light incident into the semi-spherically shaped lens L is focused toward the center C of the semi-sphere, and thus, even if no precise focus adjustment is performed based on an incident angle, polarization state, or wavelength of the incident light, the focus is automatically adjusted to the sample P. Thus, the measurement time of the thin film can be reduced.

Figure 5:
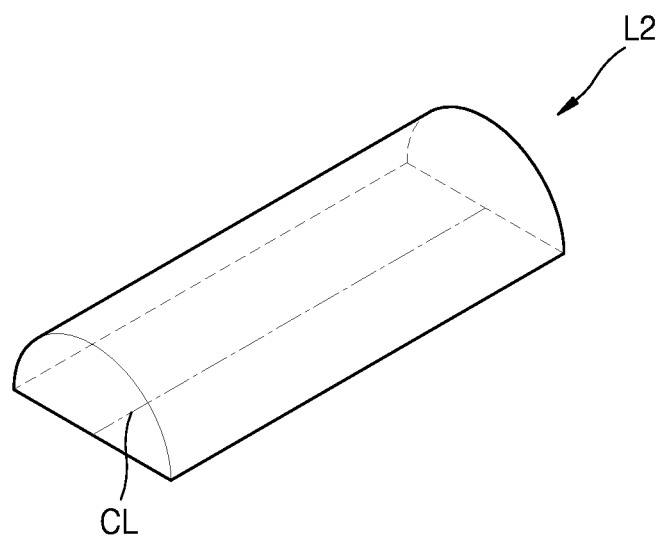
FIG. 5 is a schematic perspective view of another example of a focusing lens illustrated in FIG. 1.

FIG. 5 is a schematic perspective view of another example of a focusing lens L of FIG. 1.

Referring to FIG. 5, according to an embodiment, a focusing lens L2 has a semi-cylindrical shape, and the sample P is positioned to overlap a central line CL of the semi-cylinder. Thus, light perpendicularly incident to a side surface of the semi-cylinder is focused toward a center of a semicircular cross section of the semi-cylindrical shape located on the central line CL, regardless of an incident angle thereof, and thus, the focus is automatically adjusted to the sample P, even if no precise focus adjustment is performed based on the incident angle, polarization state, or wavelength of the incident light. Thus, the measurement time of the thin film may be reduced.

As described above, according to the one or more exemplary embodiments, since a focusing lens is located on a sample, light having different incident angles or wavelengths can be irradiated onto the same spot, and thus, the measurement time of the thin film can be reduced.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An ellipsometer, comprising:
a gantry;
a polarization generator and a polarization analyzer mounted in the gantry; and
a singlet focusing lens disposed directly on a sample on a stage,
wherein the sample is an object to be measured, wherein a vertical section of the focusing lens is a semi-circle, wherein the singlet focusing lens comprises a glass, and
wherein light generated by the polarization generator is directly incident on the focusing lens.

2. The ellipsometer of claim 1, wherein the focusing lens has one of a semi-spherical shape or a semi-cylindrical shape.

3. The ellipsometer of claim 1, wherein the gantry comprises
a first coupling portion and a second coupling portion, and
a first guide and a second guide, wherein the polarization generator and the polarization analyzer are respectively mounted in the first and second coupling portions, and the first and second coupling portions are respectively coupled to the first and second guides.

4. The ellipsometer of claim 3, wherein the gantry further comprises a longitudinal supporting portion that is vertically oriented with respect to the stage to which the first and second guides are connected, wherein each of the first and second guides is arc-shaped, and the first and second guides are symmetrically positioned with respect to the longitudinal supporting portion.

5. The ellipsometer of claim 4, wherein the first and second coupling portions move so that the first and second coupling portions remain symmetrically positioned with respect to the longitudinal supporting portion.

6. The ellipsometer of claim 1, wherein the polarization generator includes a light source that generates light, a linear polarizer in front of the light source based on a light propagation direction, and a compensator in front of the linear polarizer based on the light propagation direction.

7. The ellipsometer of claim 1, wherein the polarization analyzer includes an object lens that changes a path of reflected light and an analyzer that adjusts a polarization direction of the reflected light.

8. The ellipsometer of claim 7, further comprising a detector into which the reflected light, after having passed through the analyzer, is incident, wherein the detector includes a charge-coupled device (CCD) camera.

9. An ellipsometer, comprising:

a gantry that includes a longitudinal supporting portion that is vertically oriented with respect to a sample on a stage, a first guide and a second guide connected to the longitudinal supporting portion, and a first coupling portion and a second coupling portion respectively coupled to the first and second guides;

a polarization generator mounted in the first coupling portion;

a polarization analyzer mounted in the second coupling portion; and a singlet focusing lens directly disposed on the sample on the stage, wherein the sample is an object to be measured;

wherein an angle formed by a central axis of the longitudinal supporting portion and a central axis of the polarization generator is the same as an angle formed by the central axis of the longitudinal supporting portion and a central axis of the polarization analyzer, and wherein a vertical section of the focusing lens is a semi-circle, wherein the singlet focusing lens comprises a glass, and wherein the light generated by the polarization generator is directly incident on the focusing lens.

10. The ellipsometer of claim 9, wherein each of the first and second guides is arc-shaped, and the first and second guides are symmetrically positioned with respect to the longitudinal supporting portion.

11. The ellipsometer of claim 10, wherein the first and second coupling portions move so that the first and second coupling portions remain symmetrically positioned with respect the longitudinal supporting portion.

12. The ellipsometer of claim 9, wherein the focusing lens has one of a semi-spherical shape or a semi-cylindrical shape.

13. The ellipsometer of claim 9, wherein the polarization generator includes a light source that generates light, a linear polarizer in front of the light source based on a light propagation direction, and a compensator in front of the linear polarizer based on the light propagation direction.

14. The ellipsometer of claim 9, wherein the polarization analyzer includes an object lens that changes a path of reflected light and an analyzer that adjusts a polarization direction of the reflected light.

15. The ellipsometer of claim 14, further comprising a charge-coupled device (CCD) camera into which the reflected light, after having passed through the analyzer, is incident.

16. An ellipsometer, comprising:

a gantry that includes a first coupling portion, a second coupling portion and longitudinal supporting portion that is vertically oriented with respect to a sample on a stage;

a polarization generator and a polarization analyzer mounted in the gantry; and a singlet focusing lens directly disposed on the sample, wherein the sample is an object to be measured, wherein a vertical section of the focusing lens is a semi-circle, wherein the first and second coupling portions move so that the first and second coupling portions remain symmetrically positioned with respect to the longitudinal supporting portion, wherein the singlet focusing lens comprises a glass, and wherein light generated by the polarization generator is directly incident on the focusing lens.

17. The ellipsometer of claim 16, wherein the gantry further comprises a first guide and a second guide that are both connected to the longitudinal supporting portion, wherein each of the first and second guides is arc-shaped, and the first and second guides are symmetrically positioned with respect to the longitudinal supporting portion, and the first and second, coupling portions are respectively coupled to the first and second guides.

18. The ellipsometer of claim 16, wherein the polarization generator is mounted in the first coupling portion, and the polarization generator includes a light source that generates light, a linear polarizer in front of the light source based on a light propagation direction, and a compensator in front oft inear polarizer based on the light propagation direction.

19. The ellipsometer of claim 16, wherein the polarization analyzer is mounted in the second coupling portion, and the polarization analyzer includes an object lens that changes a path of reflected light, an analyzer that adjusts a polarization direction of the reflected light, and a detector into which the reflected light, after having passed through the analyzer, is incident.

* * * * *